(12) United States Patent
Mei et al.

(10) Patent No.: US 8,523,974 B2
(45) Date of Patent: Sep. 3, 2013

(54) FILTER CORE FOR USE WITH PLEATED FILTER CARTRIDGES

(75) Inventors: Jason Mei, Overland Park, KS (US); Charles Grant Carothers, Glasgow, MO (US); Jeffrey Allen Canfield, Belton, MO (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 13/212,243

(22) Filed: Aug. 18, 2011

(65) Prior Publication Data

US 2013/0042585 A1   Feb. 21, 2013

(51) Int. Cl.
*B01D 46/00* (2006.01)

(52) U.S. Cl.
USPC ............ 55/501; 55/498; 55/510; 210/437; 210/457

(58) Field of Classification Search
USPC ............ 55/498, 500, 501, 510; 210/437, 210/457
See application file for complete search history.

(56) References Cited

U.S. PATENT DOCUMENTS

| | | | | |
|---|---|---|---|---|
| 1,779,458 | A * | 10/1930 | Annis | 55/341.1 |
| 2,732,026 | A * | 1/1956 | Folts | 181/243 |
| 3,724,670 | A * | 4/1973 | Gernhardt | 210/448 |
| 3,737,281 | A * | 6/1973 | Guth | 431/352 |
| 5,207,812 | A | 5/1993 | Tronto et al. | |
| 5,384,044 | A * | 1/1995 | Burgess | 210/346 |
| 5,490,930 | A * | 2/1996 | Krull | 210/443 |
| 5,632,791 | A | 5/1997 | Oussoren et al. | |
| 5,885,314 | A | 3/1999 | Oussoren et al. | |
| 6,017,378 | A | 1/2000 | Oussoren et al. | |
| 6,726,735 | B1 | 4/2004 | Oussoren et al. | |
| 7,059,481 | B2 * | 6/2006 | Kochert et al. | 210/437 |
| 7,238,285 | B2 * | 7/2007 | Hacker et al. | 210/232 |
| 7,850,755 | B2 * | 12/2010 | Krull et al. | 55/498 |
| 7,854,329 | B2 * | 12/2010 | Malgorn et al. | 210/437 |
| 2003/0155293 | A1 * | 8/2003 | McGrath et al. | 210/457 |
| 2005/0103701 | A1 * | 5/2005 | Bechtum et al. | 210/340 |
| 2007/0261377 | A1 * | 11/2007 | Klug | 55/498 |

FOREIGN PATENT DOCUMENTS

| | | |
|---|---|---|
| EP | 0639103 B1 | 3/1996 |
| WO | 9323137 | 11/1993 |

* cited by examiner

*Primary Examiner* — Robert Clemente
(74) *Attorney, Agent, or Firm* — Armstrong Teasdale LLP

(57) ABSTRACT

A filter core includes a tubular body that has a first end and a second end. The tubular body includes a plurality of surface features spaced longitudinally along the tubular body between the first and second ends. Each of the surface features includes a first portion for flow area and a second portion for bridging across an opening for strength.

10 Claims, 5 Drawing Sheets

SECTION 5-5

US 8,523,974 B2

FILTER CORE FOR USE WITH PLEATED FILTER CARTRIDGES

BACKGROUND

The present disclosure relates generally to filtration systems and, more particularly, to a filter core that may be used with a pleated filter cartridge.

At least some known filtration systems include a filter cartridge that removes particulate matter, such as dust and/or debris, from fluid channeled through the filtration system. At least some known filtration systems include a filter core that is formed from a perforated and/or expanded sheet metal. Known filter cores formed from perforated and/or expanded sheet metal enable fluid to flow through perforations and/or slits at predetermined locations to clean an associated filter cartridge. Such known filter cores may be relatively weak due to the introduction of flow openings in the filter core.

BRIEF DESCRIPTION

In one aspect, a filter core is provided for use with a filter cartridge. The filter core includes a tubular body having a first end and a second end. The tubular body includes a plurality of surface features spaced longitudinally along the tubular body between the first and second ends. Each of the surface features includes a first portion for flow area and a second portion for bridging across an opening for strength.

In another aspect, a method is provided for fabricating a filter core for use with a filter cartridge. The method includes rolling a sheet to form a tubular body that has a first end and a second end. A plurality of surface features are formed spaced longitudinally along the tubular body between the first and second ends. Each of the surface features includes a first portion for flow area and a second portion for bridging across an opening for strength.

In yet another aspect, a filtration system is provided. A filter cartridge includes a sidewall that defines a clean air channel. A filter core is sized to be positioned within the clean air channel. The filter core includes a tubular body having a first end and a second end. The tubular body includes a plurality of surface features spaced longitudinally along the tubular body between the first and second ends. Each of the surface features includes a first portion for flow area and a second portion for bridging across an opening for strength.

The features, functions, and advantages described herein may be achieved independently in various embodiments of the present disclosure or may be combined in yet other embodiments, further details of which may be seen with reference to the following description and drawings.

Although specific features of various embodiments may be shown in some drawings and not in others, this is for convenience only. Any feature of any drawing may be referenced and/or claimed in combination with any feature of any other drawing.

DETAILED DESCRIPTION

The subject matter described herein relates generally to filtration systems and, more particularly, to a filter core that may be used with a pleated filter cartridge and a method for fabricating the same. The filter core may be used for any fluid (i.e., gas or liquid) filtration system that employs a reverse flow or bi-directional cleaning. As described herein, "forward flow" refers to a fluid flow in a conventional direction, "reverse flow" refers to a fluid flow in a direction that is opposite the conventional direction, and "bi-directional" refers to a selective fluid flow in either direction. In one embodiment, a filter core includes a tubular body having a first end and a second end. A plurality of surface features are spaced longitudinally along the body between the first and second ends. Each of the surface features includes a first portion for flow area and a second portion for bridging across an opening for strength. More specifically, the surface features are pushed radially inward from the tubular body, thus increasing a rigidity and/or strength of the tubular body. Accordingly, in such an embodiment, the surface features facilitate the use of thinner gauge sheet metal to form the tubular body as compared to conventional filter cores, thereby reducing a weight and/or a cost associated with the filtration system.

As used herein, an element or step recited in the singular and proceeded with the word "a" or "an" should be understood as not excluding plural elements or steps unless such exclusion is explicitly recited. Furthermore, references to "one embodiment" of the present invention or the "exemplary embodiment" are not intended to be interpreted as excluding the existence of additional embodiments that also incorporate the recited features.

Figure 1:
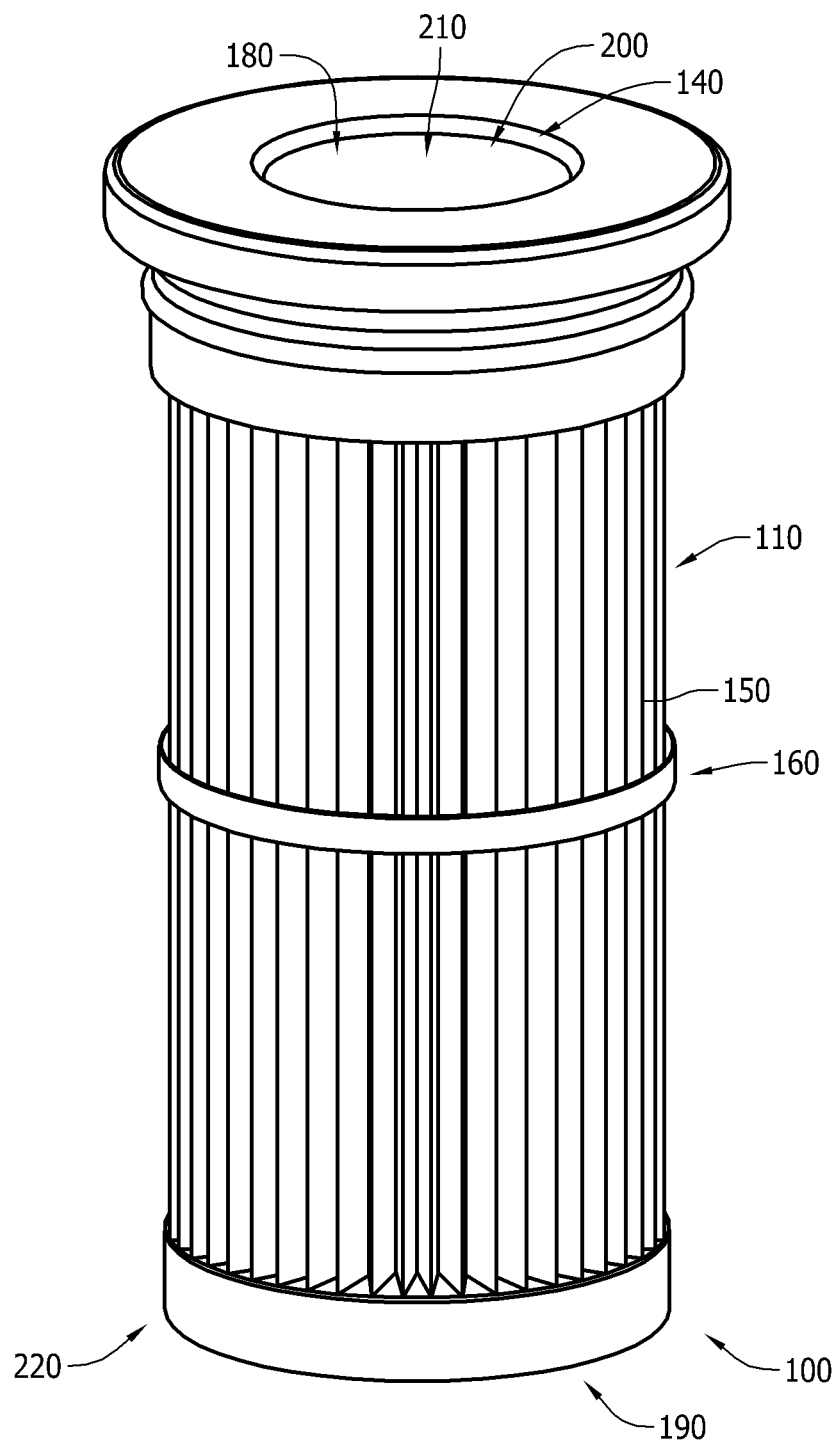
FIG. 1 is a perspective view of an exemplary filtration system.
Figure 2:
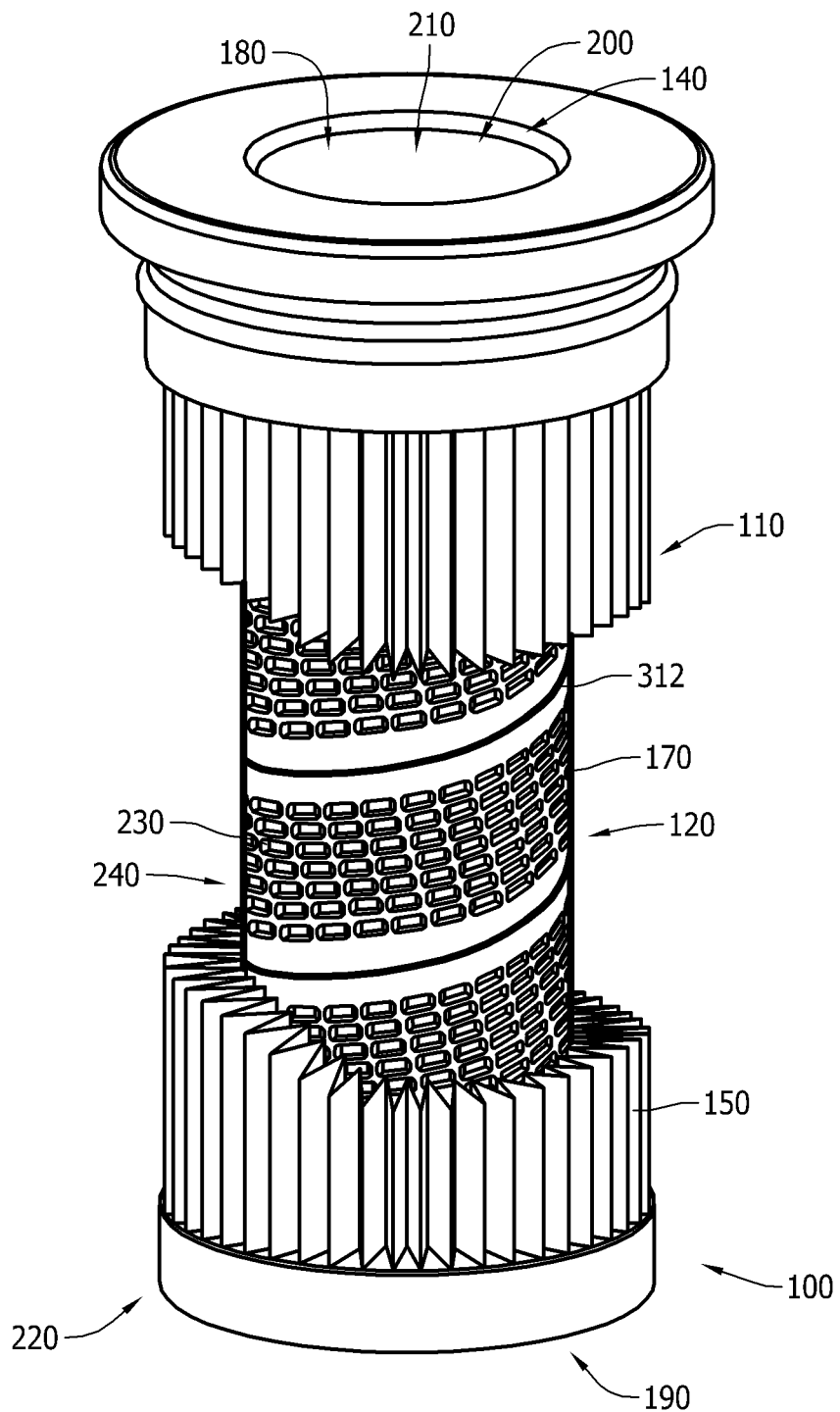
FIGS. 2 and 3 are partial cutaway views of the filtration system shown in FIG. 1.
Figure 3:
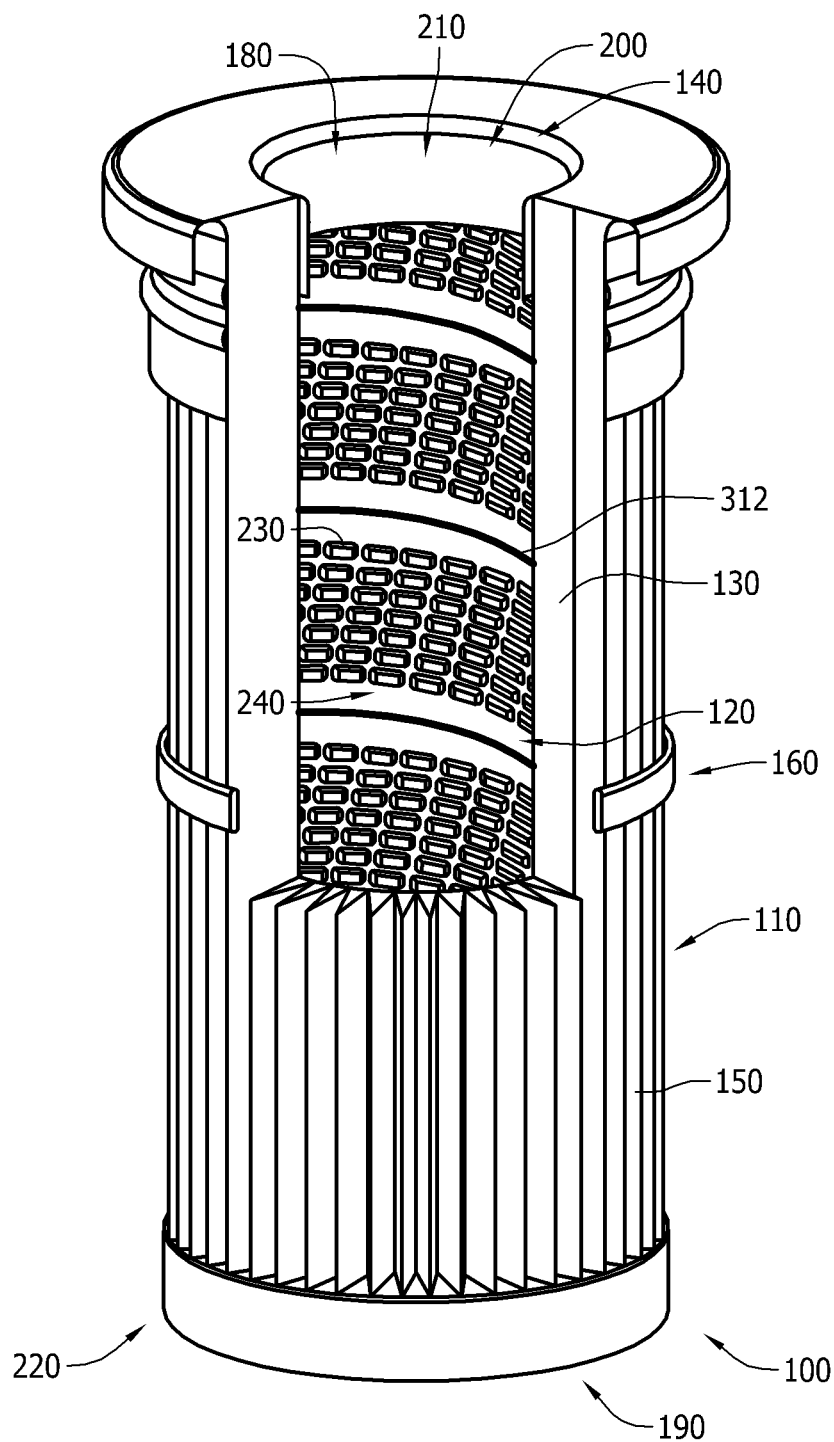
Figure 4:
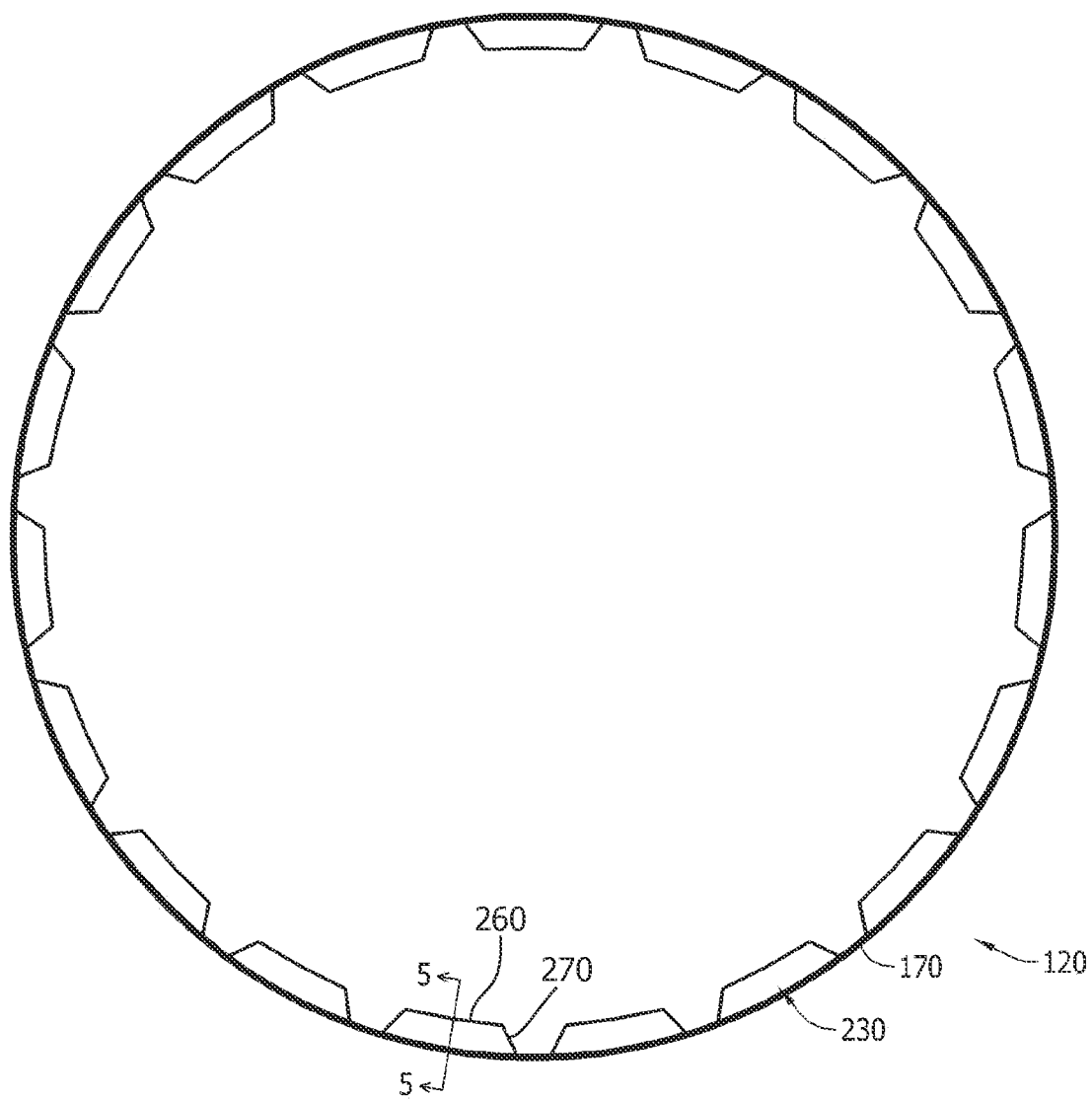
FIG. 4 is a top view of an exemplary filter core that may be used with the filtration system shown in FIG. 1.

FIG. 1 illustrates an exemplary filtration system 100 that includes a filter cartridge 110 and a filter core 120 (shown, for example, in FIG. 2). FIGS. 2 and 3 are each partial cutaway views of filtration system 100. FIG. 4 is a top view of filter core 120. In the exemplary embodiment, filter core 120 is positioned to support filter cartridge 110. In the exemplary embodiment, filtration system 100 is used in a pulse cleaning application. Alternatively, filtration system 100 may be used in any other filter cleaning application that enables filtration system 100 to function as described herein.

In the exemplary embodiment, filter cartridge 110 includes a sidewall 130 that defines a clean air channel 140 within filter cartridge 110. In the exemplary embodiment, a plurality of pleats 150 extend radially outward from sidewall 130. Moreover, in the exemplary embodiment, pleats 150 are spaced substantially equidistantly circumferentially about sidewall 130. In the exemplary embodiment, pleats 150 are fabricated from a filter media that enables fluid to be channeled through filtration system 100 to be purified.

In the exemplary embodiment, filter cartridge 110 or, more particularly, clean air channel 140 is sized to receive filter core 120 therein. More specifically, in the exemplary embodiment, filter core 120 is positionable within filter channel 140 to facilitate supporting and/or restraining the filter media from excessive radially inward movement during forward flow in a first direction.

In the exemplary embodiment, a retainer 160 extends circumferentially about pleats 150 to facilitate aligning pleats 150. In the exemplary embodiment, retainer 160 is fabricated from a thermoplastic polymer material that provides rigidity, strength, durability, and/or flexibility. In the exemplary embodiment, retainer 160 limits radially outward movement of the filter media during reverse flow in a second direction. Moreover, in the exemplary embodiment, the thermoplastic polymer is substantially resistant to chemical attack, hydrolysis, and/or abrasion. Alternatively, retainer 160 may be fabricated from any other material that enables retainer 160 to function as described herein.

In the exemplary embodiment, filter core 120 is positioned within clean air channel 140. In the exemplary embodiment, filter core 120 is fabricated from a rigid material, such as metal and/or plastic. Alternatively, the flat sheet may be fabricated from any material that enables filter core 120 to function as described herein.

In the exemplary embodiment, filter core 120 has a tubular body 170 that includes a first end 180 and a second end 190. In the exemplary embodiment, tubular body 170 has a thickness that is between approximately 0.0090 inches (in.) and approximately 0.0179 in. More particularly, in the exemplary embodiment, the thickness is between approximately 0.0105 in. and approximately 0.0149 in. Even more particularly, in the exemplary embodiment, the thickness is approximately 0.0110 in. Alternatively, tubular body 170 may have any thickness that enables filter core 120 to function as described herein.

In the exemplary embodiment, tubular body 170 defines a cavity 200 that enables fluid to be channeled substantially longitudinally between first and second ends 180 and 190. In the exemplary embodiment, first end 180 defines an opening 210 that enables fluid to be channeled into cavity 200, and second end 190 includes a pan 220 that seals second end 190 to facilitate preventing fluid flow from bypassing filter cartridge 110. Alternatively, first and/or second ends 180 and 190 may have any configuration that enables filtration system 100 to function as described herein.

In the exemplary embodiment, a plurality of surface features 230 (shown, for example, in FIG. 2) are spaced substantially longitudinally along tubular body 170 between first and second ends 180 and 190. In the exemplary embodiment, surface features 230 are arranged in a staggered array 240. More specifically, in the exemplary embodiment, surface features 230 in array 240 are oriented substantially helically along at least a portion tubular body 170. Alternatively, surface features 230 may be arranged in any configuration and/or array 240 may extend over any portion of tubular body 170 that enables filter core 120 to function as described herein.

Figure 5:
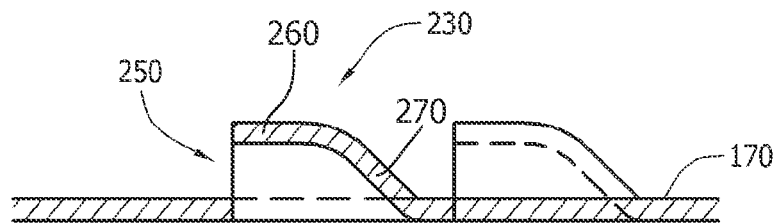
FIG. 5 is an enlarged cross-sectional view of an outer surface of the filter core shown in FIG. 4.

In the exemplary embodiment, each surface feature 230 at least partially defines at least one opening 250 (shown, for example, in FIG. 5) therein that enables fluid to be channeled between filter cartridge 110 and cavity 200. More specifically, as shown in FIGS. 4 and 5, each surface feature 230 is formed as a scoop that protrudes radially inward from tubular body 170 and that is oriented to channel fluid in a substantially helical direction along tubular body 170. In the exemplary embodiment, each surface feature 230 includes a first portion 260 for flow area and a second portion 270 for bridging across opening 250 for strength. That is, first portion 260 is configured to channel fluid in and out of filter core 120 through opening 250, and second portion 270 provides strength to surface feature 230.

In the exemplary embodiment, surface feature 230 is oriented such that opening 250 generally faces first end 180. As such, in the exemplary embodiment, surface feature 230 facilitates enhancing a fluid flow within filtration system 100. More specifically, surface feature 230 enables fluid to be channeled from a substantially radial direction to a substantially axial direction during forward flow, and from a substantially axial direction to a substantially radial direction during reverse flow. Alternatively, surface feature 230 may have any configuration and/or orientation that enables filter core 120 to function as described herein.

During operation, fluid, such as air, is channeled through filtration system 100 in a first or operating direction during forward flow to facilitate removing particulate matter, such as dust and/or debris, entrained in the fluid. More specifically, during forward flow, fluid is channeled from outside of filtration system 100, substantially radially inward through filter cartridge 110, substantially axially along a length of filter core 120, and discharged from first end opening 210. Over time, the particulate matter accumulates on the filter media.

To facilitate cleaning filter cartridge 110, in the exemplary embodiment, fluid is channeled through filtration system 100 in a second or cleaning direction during reverse flow to facilitate removing dust and/or debris from filter cartridge 110. More specifically, in the exemplary embodiment, a flow of compressed air and/or jet air is directed, such as pulsed, through first end opening 210 substantially axially toward second end 180 against the forward flow. In the exemplary embodiment, the fluid is subsequently channeled substantially radially outward through openings 250 and toward filter cartridge 110, thus creating a shockwave and positive displacement that facilitates removing dust and/or debris from the filter media.

Figure 6:
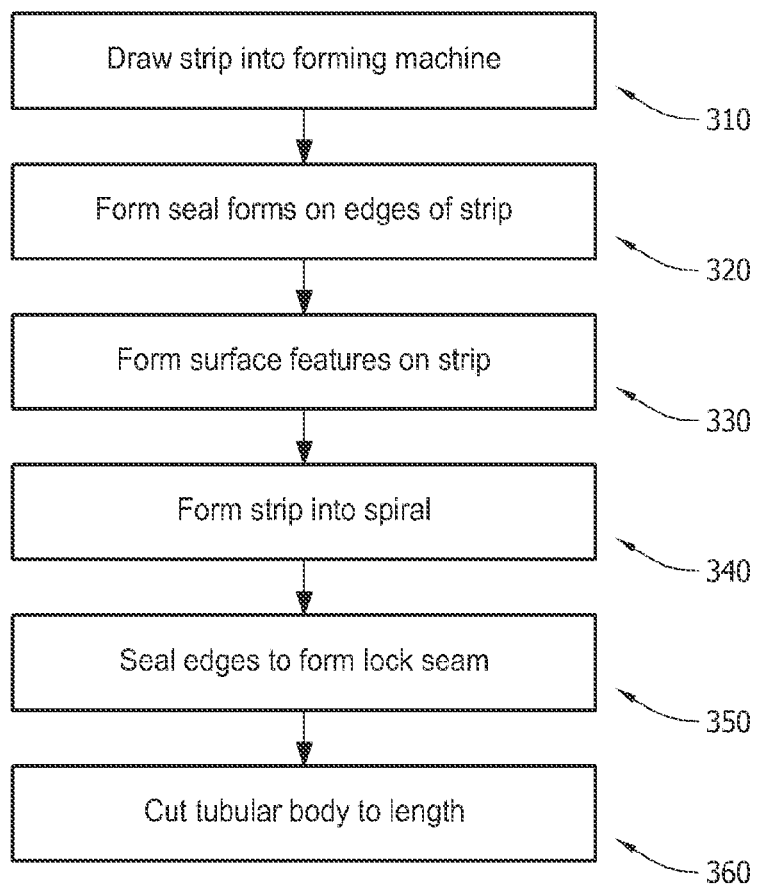
FIG. 6 is a flowchart of an exemplary method that may be implemented to fabricate the filter core shown in FIG. 4.

FIG. 6 is a flowchart of an exemplary method 300 that may be implemented to fabricate and/or assemble filter core 120. In the exemplary embodiment, a flat strip or sheet is initially drawn 310 into a forming machine (not shown), and a seal form 312 (shown, for example, in FIG. 2) is formed 320 along an edge of the sheet. In the exemplary embodiment, the sheet is formed at least partially from a steel material. Alternatively, the flat sheet may be fabricated from any material that enables filter core 120 to function as described herein.

In the exemplary embodiment, surface features 230 are then formed 330 in an array 240, wherein each surface features 230 extends and protrudes from the sheet. In the exemplary embodiment, the forming machine is used to form 330 surface features 230 in the sheet. More specifically, in the exemplary embodiment, each surface feature 230 includes opening 250 that enables fluid to be channeled therethrough.

In the exemplary embodiment, the sheet is then formed 340 into a body, such as tubular body 170. More specifically, in the exemplary embodiment, the sheet is rolled at an angle relative to a longitudinal axis of the sheet such that the sheet or, more particularly, seal form 312 and/or surface features 230 extend generally helically along at least a portion of tubular body 170 between first end 180 and second end 190. In the exemplary embodiment, the sheet is rolled such that surface features 230 extend and/or protrude radially inward from tubular body 170 toward a center axis (not shown) of tubular body 170.

In the exemplary embodiment, the sheet edges are sealed 350 to form a lock seam such that fluid channeled radially into cavity 200 flows through surface feature openings 250. In the exemplary embodiment, seal forms 312 enable the edges to be sealed 350. Moreover, in the exemplary embodiment, tubular body 170 is cut 360 to a predetermined length such that tubular body 170 is formed with at least one open end 180.

The subject matter described herein facilitates reducing a thickness of a filter core, thereby decreasing a material cost associated with the fabrication and/or assembly of the filter core. More specifically, the subject matter described herein enables a filter core to be fabricated with a strength and/or stiffness that enables the filter core to be produced using thinner gauge metal sheets as compared to metal sheets used in fabricating conventional filter cores. Moreover, the subject matter described herein enables a filter cartridge to be effectively cleaned.

Exemplary embodiments of a filter core and methods of fabricating and/or assembling the same are described above in detail. The systems and methods are not limited to the specific embodiments described herein, but rather, components of systems and/or steps of the method may be utilized independently and separately from other components and/or steps described herein. Each component and each method step may also be used in combination with other components and/or method steps. Although specific features of various embodiments may be shown in some drawings and not in others, this is for convenience only. Any feature of a drawing may be referenced and/or claimed in combination with any feature of any other drawing.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A filter core for use with a filter cartridge, said filter core comprising a tubular body having a first end and a second end wherein at least one of said first end and said second end defines an opening that enables fluid to be channeled therethrough, wherein said tubular body comprises a plurality of surface features spaced longitudinally along said tubular body between said first and second ends, each of said plurality of surface features including a surface feature opening defined therein and comprising a first portion for flow area and a second portion for bridging across said surface feature opening for strength, wherein each of said surface features are oriented such that each said surface feature opening faces towards said tubular body opening.

2. A filter core in accordance with claim 1, wherein each of said plurality of surface features extends radially inward from said tubular body towards a center axis of said filter core.

3. A filter core in accordance with claim 1, wherein said plurality of surface features are oriented generally helically across at least a portion of said tubular body.

4. A filter core in accordance with claim 1, wherein said plurality of surface features are arranged in a predefined array that is oriented generally helically across at least a portion of said tubular body.

5. A filter core in accordance with claim 1, wherein said plurality of surface features comprise a plurality of scoops that are disposed to enhance a fluid flow.

6. A filtration system comprising:
a filter cartridge including a sidewall that defines a clean air channel; and
a filter core that is sized to be positioned within the clean air channel, said filter core comprising a tubular body having a first end and a second end wherein at least one of said first end and said second end defines an opening that enables fluid to be channeled therethrough, wherein said tubular body comprises a plurality of surface features spaced longitudinally along said tubular body between said first and second ends, each of said plurality of surface features including a surface feature opening defined therein and comprising a first portion for flow area and a second portion for bridging across said surface feature opening for strength, wherein each of said surface features are oriented such that each said surface feature opening faces towards said tubular body opening.

7. A filtration system in accordance with claim 6, wherein each of said plurality of surface features extends radially inward from said tubular body towards a center axis of said filter core.

8. A filtration system in accordance with claim 6, wherein said plurality of surface features are oriented generally helically across at least a portion said tubular body.

9. A filtration system in accordance with claim 6, wherein said plurality of surface features are arranged in a predefined array that is oriented generally helically across at least a portion of said tubular body.

10. A filtration system in accordance with claim 6, wherein said filter cartridge comprises a plurality of pleats extending radially outward from said sidewall.

* * * * *